United States Patent
Hasegawa et al.

(10) Patent No.: US 11,130,870 B2
(45) Date of Patent: Sep. 28, 2021

(54) POWDER COATING MATERIAL, METHOD FOR PRODUCING SUBSTRATE PROVIDED WITH COATING FILM, COATED ARTICLE AND FLUORINATED POLYMER

(71) Applicant: AGC Inc., Chiyoda-ku (JP)

(72) Inventors: Yui Hasegawa, Chiyoda-ku (JP); Yuji Hara, Chiyoda-ku (JP); Naoko Sumi, Chiyoda-ku (JP); Shun Saito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/502,375

(22) Filed: Jul. 3, 2019

(65) Prior Publication Data

US 2019/0322873 A1 Oct. 24, 2019

Related U.S. Application Data

(63) Continuation of application No. PCT/JP2018/000500, filed on Jan. 11, 2018.

(30) Foreign Application Priority Data

Jan. 12, 2017 (JP) .............................. JP2017-003520

(51) Int. Cl.
| | |
|---|---|
| *C08F 218/04* | (2006.01) |
| *C09D 127/12* | (2006.01) |
| *C09D 131/02* | (2006.01) |
| *C09D 5/03* | (2006.01) |
| *C08F 214/24* | (2006.01) |

(52) U.S. Cl.
CPC ............ *C09D 5/03* (2013.01); *C08F 214/245* (2013.01); *C08F 214/247* (2013.01); *C08F 218/04* (2013.01); *C09D 127/12* (2013.01); *C09D 131/02* (2013.01)

(58) Field of Classification Search
CPC ...... C09D 5/03; C09D 127/12; C09D 131/02; C08F 214/245; C08F 214/247; C08F 216/1416; C08F 218/04; C08F 218/08; C08F 218/10; B05D 7/24; B32B 27/30
See application file for complete search history.

(56) References Cited

FOREIGN PATENT DOCUMENTS

| | | |
|---|---|---|
| EP | 0 508 229 A2 | 10/1992 |
| JP | 6-172451 | 6/1994 |
| JP | 7-238116 | 9/1995 |
| JP | 8-157537 | 6/1996 |
| JP | 8-337620 | 12/1996 |
| JP | 10-231329 | 9/1998 |
| JP | 11-60646 | 3/1999 |
| JP | 2000-26767 | 1/2000 |
| JP | 2000-239395 A | 9/2000 |
| JP | 2003-82295 | 3/2003 |
| JP | 2003-96377 | 4/2003 |
| JP | 2003-105270 | 4/2003 |
| JP | 2013-177535 | 9/2013 |
| WO | WO2004/072197 A1 | 8/2004 |
| WO | WO-2015137286 A1 * | 9/2015 ........... C09D 127/12 |
| WO | WO 2018/194070 A1 | 10/2018 |

OTHER PUBLICATIONS

International Search Report dated Apr. 3, 2018 in PCT/JP2018/000500 filed on Jan. 11, 2018 (with English translation).
Database CA [Online] Chemical Abstracts Service, Columbus, Ohio, US; Okada, Katsuhiko et al: "Manufacture of powder fluoropolymers without yellowing problem", XP002798978, retrieved from STN Database accession No. 2000:619442 ; & JP 2000 239395 A (DaiNippon Ink & Chemicals), Sep. 5, 2000, 8 pages.

* cited by examiner

*Primary Examiner* — Alexander M Weddle
(74) *Attorney, Agent, or Firm* — Oblon, McClelland, Maier & Neustadt, L.L.P.

(57) ABSTRACT

To provide a powder coating material capable of forming a coating film excellent in impact resistance, flexibility and adhesion to substrate and excellent in surface smoothness even when formed under low temperature film-forming conditions.
The powder coating material of the present invention is a powder coating material comprising a fluorinated polymer having units based on a fluoroolefin, units based on a monomer represented by the formula X—Z and units based on a monomer represented by the formula $CHR^{21}$=$CR^{22}$ $(CH_2)_n COOH$, wherein the content of the units based on a monomer represented by the formula X—Z is from 5 to 20 mol % to all units in the fluorinated polymer, and the fluorinated polymer has a melt viscosity at 170° C. of from 20 to 100 Pa·s (in the formulae, X is a specific monovalent polymerizable group, Z is a specific alkyl group, a specific cycloalkyl group or a specific aryl group, $R^{21}$ and $R^{22}$ are each independently a hydrogen atom or a specific alkyl group, and n is an integer of from 0 to 12.

14 Claims, No Drawings

POWDER COATING MATERIAL, METHOD FOR PRODUCING SUBSTRATE PROVIDED WITH COATING FILM, COATED ARTICLE AND FLUORINATED POLYMER

TECHNICAL FIELD

The present invention relates to a powder coating material, a method for producing a substrate provided with a coating film, a coated article and a fluorinated polymer.

BACKGROUND ART

In recent years, in the paint industry, from the viewpoint of environmental burden, it has been desired to suppress discharge of volatile organic compounds (VOC) such as organic solvents into the atmosphere.

Accordingly, from the viewpoint of de-VOC, a powder coating material containing no organic solvent has attracted attention. A powder coating material does not require the exhaust gas treatment and waste water treatment at the time of coating and can be recovered and reused and thereby has low environmental impact.

Patent Document 1 discloses a powder coating material comprising a fluorinated polymer having carboxy groups as a polymer for coating material and a compound having a β-hydroxyalkylamide group as a curing agent. Patent Document 1 discloses that the powder coating material is excellent in low temperature curing property and is capable of forming a coating film with little formation of burnt deposit and coating film defects.

PRIOR ART DOCUMENTS

Patent Documents

Patent Document 1: JP-A-2003-96377

DISCLOSURE OF INVENTION

Technical Problem

In recent years, further improvement in physical properties of a powder coating material containing a fluorinated polymer is required, and a powder coating material capable of forming on a substrate a coating film having impact resistance, flexibility and adhesion to substrate has been required. Further, in heat treatment to melt the powder coating material applied to the substrate thereby to form a coating film, the heat treatment temperature is preferably low from the viewpoint of reduction of the damage of the substrate, the operation efficiency, etc.

The present inventors have found that the powder coating material disclosed in Patent Document 1 is excellent in coating film forming capability at low temperature, whereas the resulting coating film is still insufficient in impact resistance, flexibility and adhesion to substrate.

Under these circumstances, the object of the present invention is to provide a powder coating material capable of forming a coating film excellent in impact resistance, flexibility and adhesion to substrate, and is excellent in surface smoothness even when formed at low temperature. Further, another object of the present invention is to provide a fluorinated polymer, a method for producing a substrate provided with a coating film, and a coated article.

Solution to Problem

The present inventors have conducted extensive studies to achieve the above objects and as a result, found that desired effects can be obtained by using a fluorinated polymer containing a predetermined amount of units based on a specific monomer which contributes to physical properties of a powder coating material and having a melt viscosity within a predetermined range, and accomplished the present invention.

That is, the present inventors have found that the above objects can be achieved by the following constitutions.

[1] A powder coating material comprising a fluorinated polymer having units based on a fluoroolefin, units based on a monomer represented by the following formula (1) and units based on a monomer represented by the following formula (2), wherein the content of the units based on a monomer represented by the formula (2) is from 5 to 20 mol % to all units in the fluorinated polymer, and the fluorinated polymer has a melt viscosity at 170° C. of from 20 to 100 Pa·s:

$$X-Z \qquad \text{formula (1):}$$

$$CHR^{21}=CR^{22}(CH_2)_nCOOH \qquad \text{formula (2):}$$

wherein X is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, Z is a $C_{4-8}$ alkyl group represented by the formula $-C(Z^1)_3$, a $C_{6-10}$ cycloalkyl group, a $C_{6-10}$ cycloalkylalkyl group, a $C_{6-10}$ aryl group or a $C_{7-12}$ aralkyl group, provided that three $Z^1$'s are each independently a $C_{1-5}$ alkyl group, and the total number of carbon atoms of the three $Z^1$'s is an integer of from 3 to 7, $R^{21}$ and $R^{22}$ are each independently a hydrogen atom or a $C_{1-3}$ alkyl group, and n is an integer of from 0 to 12.

[2] The powder coating material according to [1], wherein the fluorinated polymer has a glass transition temperature of from 45 to 120° C.

[3] The powder coating material according to [1] or [2], wherein the fluorinated polymer has a weight average molecular weight of from 15,000 to 75,000.

[4] The powder coating material according to any one of [1] to [3], wherein the content of the units based on a fluoroolefin is from 20 to 60 mol %, and the content of the units based on a monomer represented by the formula (1) is from 5 to 60 mol %, to all units in the fluorinated polymer.

[5] The powder coating material according to any one of [1] to [4], wherein the fluorinated polymer further has units based on a monomer represented by the following formula (3), and the content of the units is more than 0 mol % and at most 40 mol % to all units in the fluorinated polymer:

$$X^3-Z^3 \qquad \text{formula (3):}$$

wherein $X^3$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, and $Z^3$ is a $C_{1-3}$ alkyl group.

[6] The powder coating material according to any one of [1] to [5], wherein the fluorinated polymer contains no units based on a monomer represented by the following formula (4), or contains the units in a content of less than 5 mol % to all units in the fluorinated polymer:

$$X^4\text{-}Q^4\text{-}OH \qquad \text{formula (4):}$$

wherein $X^4$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, and $Q^4$ is a $C_{2-20}$ alkylene group which may contain a cyclic structure.

[7] The powder coating material according to any one of [1] to [6], wherein the fluorinated polymer contains no units based on a monomer represented by the following formula (5), or contains the units in a content of less than 8 mol % to all units in the fluorinated polymer:

$$X^5—Z^5 \quad \text{formula (5):}$$

wherein $X^5$ is $CH_2$=CHC(O)O—, $CH_2$=C(CH$_3$)C(O)O—, $CH_2$=CHOC(O)—, $CH_2$=CHCH$_2$OC(O)—, $CH_2$=CHO— or $CH_2$=CHCH$_2$O—, and $Z^5$ is an alkyl group having at least 4 carbon atoms, excluding a $C_{4-8}$ alkyl group represented by the formula —C($Z^1$)$_3$, provided that three $Z^1$'s are each independently a $C_{1-5}$ alkyl group, and the total number of carbon atoms of the three $Z^1$'s is an integer of from 3 to 7.

[8] The powder coating material according to any one of [1] to [7], which further contains a curing agent comprising a compound having in one molecule at least two epoxy groups, carbodiimide groups, oxazoline groups or β-hydroxyalkylamide groups.

[9] The powder coating material according to [8], wherein the content of the curing agent is from 1 to 50 mass % to the fluorinated polymer.

[10] The powder coating material according to [8] or [9], which is constituted by particles containing the fluorinated polymer and the curing agent.

[11] A method for producing a substrate provided with a coating film, which comprises applying the powder coating material as defined in any one of [1] to [10] to a substrate to form a powder coating material layer, and subjecting the powder coating material layer to heat treatment to form a coating film on the substrate.

[12] A coated article comprising a substrate and a coating film formed from the powder coating material as defined in any one of [1] to [10] on the substrate.

[13] A fluorinated polymer having units based on a fluoroolefin, units based on a monomer represented by the following formula (1) and units based on a monomer represented by the following formula (2), wherein the content of the units based on a monomer represented by the formula (2) is from 5 to 20 mol % to all units in the fluorinated polymer, and the fluorinated polymer has a weight average molecular weight of from 15,000 to 75,000:

$$X—Z \quad \text{formula (1):}$$

$$CHR^{21}=CR^{22}(CH_2)_n COOH \quad \text{formula (2):}$$

wherein X is $CH_2$=CHC(O)O—, $CH_2$=C(CH$_3$)C(O)O—, $CH_2$=CHOC(O)—, $CH_2$=CHCH$_2$OC(O)—, $CH_2$=CHO— or $CH_2$=CHCH$_2$O—, Z is a $C_{4-8}$ alkyl group represented by the formula —C($Z^1$)$_3$, a $C_{6-10}$ cycloalkyl group, a $C_{6-10}$ cycloalkylalkyl group, a $C_{6-10}$ aryl group or a $C_{7-12}$ aralkyl group, provided that three $Z^1$'s are each independently a $C_{1-5}$ alkyl group, and the total number of carbon atoms of the three $Z^1$'s is an integer of from 3 to 7, $R^{21}$ and $R^{22}$ are each independently a hydrogen atom or a $C_{1-3}$ alkyl group, and n is an integer of from 0 to 12.

[14] A fluorinated polymer having units based on a fluoroolefin, units based on a monomer represented by the following formula (1) and units based on a monomer represented by the following formula (2), wherein the content of the units based on a monomer represented by the formula (2) is from 5 to 20 mol % to all units in the fluorinated polymer, and the fluorinated polymer has a melt viscosity at 170° C. of from 20 to 100 Pa·s:

$$X—Z \quad \text{formula (1):}$$

$$CHR^{21}=CR^{22}(CH_2)_n COOH \quad \text{formula (2):}$$

wherein X is $CH_2$=CHC(O)O—, $CH_2$=C(CH$_3$)C(O)O—, $CH_2$=CHOC(O)—, $CH_2$=CHCH$_2$OC(O)—, $CH_2$=CHO— or $CH_2$=CHCH$_2$O—, Z is a $C_{4-8}$ alkyl group represented by the formula —C($Z^1$)$_3$, a $C_{6-10}$ cycloalkyl group, a $C_{6-10}$ cycloalkylalkyl group, a $C_{6-10}$ aryl group or a $C_{7-12}$ aralkyl group, provided that three $Z^1$'s are each independently a $C_{1-5}$ alkyl group, and the total number of carbon atoms of the three $Z^1$'s is an integer of from 3 to 7, $R^{21}$ and $R^{22}$ are each independently a hydrogen atom or a $C_{1-3}$ alkyl group, and n is an integer of from 0 to 12.

Advantageous Effects of Invention

According to the present invention, it is possible to provide a powder coating material capable of forming a coating film excellent in impact resistance, flexibility and adhesion to substrate and is excellent in surface smoothness even when formed at low temperature, and a fluorinated polymer.

DESCRIPTION OF EMBODIMENTS

Meanings of terms in the present invention are as follows.

A "unit" generally means an atomic group derived from one molecule of a monomer directly formed by polymerization of the monomer and an atomic group obtained by chemical conversion of a part of the atomic group.

The content (mol %) of each type of units to all units in a polymer is obtained by analyzing the polymer by nuclear magnetic resonance (NMR) spectroscopy.

A "(meth)acrylate" generally means an "acrylate" and a "methacrylate", and "(meth)acrylic" generally means "acrylic" and "methacrylic".

The "glass transition temperature" is the midpoint glass transition temperature as measured by differential scanning calorimetry (DSC) method. The "glass transition temperature" will sometimes be referred to as "Tg".

The "melt viscosity" means a value of the melt viscosity of a sample at 170° C., when heated at a heating rage of 10° C./min from 130° C. to 200° C. by a rotary rheometer.

The "weight average molecular weight" is a value measured by gel permeation chromatography using polystyrene as a standard substance. The "weight average molecular weight" will sometimes be referred to as "Mw".

The "acid value" and the "hydroxy value" are respectively values measured in accordance with the method in JIS K0070-3 (1992).

The average particle size of particles constituting a powder is a value obtained by calculating a volume average from particle size distribution measured by using a known particle size distribution measuring apparatus ("Helos-Rodos", tradename, manufactured by Sympatec GmbH) based on laser diffraction method as measurement principle. Hereinafter, particles constituting a powder coating material will sometimes be referred to as "coating material particles".

The powder coating material of the present invention is a powder coating material comprising a fluorinated polymer having units (hereinafter sometimes referred to as "units F") based on a fluoroolefin, units (hereinafter sometimes referred to as "units A") based on a monomer (hereinafter sometimes referred to as "monomer A") represented by the after-described formula (1) and units (hereinafter sometimes referred to as "units B") based on a monomer (hereinafter sometimes referred to as "monomer B") represented by the after-described formula (2). In the powder coating material of the present invention, the content of the units B to all units in the fluorinated polymer is from 5 to 20 mol %. The melt viscosity of the fluorinated polymer at 170° C. is from 20 to 100 Pa·s.

A coating film formed by heating the powder coating material of the present invention (hereinafter sometimes referred to as "the present coating film") is excellent in impact resistance and flexibility. The reason is an increase of crosslinking sites by carboxy groups in the units B contained in a predetermined amount or more in the fluorinated polymer, and a predetermined melt viscosity of the fluorinated polymer. That is, it is considered that during formation of the present coating film, coating material particles containing the fluorinated polymer are highly uniformly crosslinked in a dense packed state, and are thereby capable of forming a coating film excellent in the impact resistance and the flexibility.

Further, the present coating film is excellent in the adhesion to substrate. The reason is estimated to be such that the units B each having a carboxy group as a polar group which improves the adhesion to substrate are contained in a predetermined amount or more in the fluorinated polymer.

Further, according to the powder coating material of the present invention, it is possible to form a coating film excellent in surface smoothness even under low temperature film-forming conditions (conditions under which a coating film is formed by heat treatment at a temperature of about 170° C., the same applies hereinafter). The reason is estimated to be such that the melt viscosity of the fluorinated polymer at 170° C. is at most a predetermined amount, and the fluorinated polymer has favorable flowability.

On the other hand, in the fluorinated polymer specifically disclosed in Patent Document 1, the content of units based on a monomer having a carboxy group is only less than 5 mol % to all units in the fluorinated polymer, and the present inventors have found that a coating film like the present coating film cannot be obtained in such a case (see the after-described Comparative Example 1).

As described above, a conventional fluorinated polymer having carboxy groups has a low content of units based on a monomer having a carboxy group, and a powder coating material containing it is not capable of forming a coating film like the present coating film.

The present inventors have found effects such that by combining the types and contents of units in a fluorinated polymer and by adjusting the melt viscosity of the fluorinated polymer, a coating film of such a powder coating material is excellent in impact resistance, flexibility, adhesion to substrate and low temperature film forming properties (see the after-described Examples). Such effects are particularly remarkable in the preferred range of the present invention.

The fluoroolefin in the present invention is an olefin in which at least one hydrogen atom is substituted by a fluorine atom. In the fluoroolefin, at least one hydrogen atom not substituted by a fluorine atom may be substituted by a chlorine atom.

The fluoroolefin may, for example, be $CF_2=CF_2$, $CF_2=CFCl$, $CF_2=CHF$, $CH_2=CF_2$, $CF_2=CFCF_3$ or $CF_2=CHCF_3$. From the viewpoint of more excellent weather resistance of the present coating film, the fluoroolefin is preferably $CF_2=CF_2$ or $CF_2=CFCl$, and from the viewpoint of alternating copolymerizability with other monomer (particularly monomer B) and the rate of polymerization, it is particularly preferably $CF_2=CFCl$.

The fluoroolefin may be used in combination of two or more.

The content of the units F in the present invention is, from the viewpoint of more excellent weather resistance, preferably from 20 to 60 mol %, more preferably from 30 to 50 mol %, particularly preferably from 35 to 45 mol % to all units contained in the fluorinated polymer.

The monomer A in the present invention is a monomer represented by the following formula (1) and is a monomer which forms units mainly contributing to an increase of Tg of the fluorinated polymer and improving block resistance of the powder coating material of the present invention.

$$X—Z \qquad \text{Formula (1):}$$

The symbols in the formula have the following meanings. X is $CH_2=CHC(O)O—$, $CH_2=C(CH_3)C(O)O—$, $CH_2=CHOC(O)—$, $CH_2=CHCH_2OC(O)—$, $CH_2=CHO—$ or $CH_2=CHCH_2O—$. From the viewpoint of the weather resistance of the present coating film, X is preferably $CH_2=CHOC(O)—$, $CH_2=CHCH_2OC(O)—$, $CH_2=CHO—$ or $CH_2=CHCH_2O—$, more preferably $CH_2=CHOC(O)—$. A monomer A wherein X is $CH_2=CHO—$ or $CH_2=CHOC(O)—$, particularly a monomer A wherein X is $CH_2=CHOC(O)—$ is excellent in the alternating copolymerizability with other monomer (particularly monomer B) and the rate of polymerization, and has a high effect to make the units B be uniformly present in the fluorinated polymer. As a result, a powder coating material capable of forming a coating film more excellent in impact resistance and flexibility is likely to be prepared.

Z is a $C_{4-8}$ alkyl group represented by the formula $—C(Z^1)_3$ (provided that three $Z^1$'s are each independently a $C_{1-5}$ alkyl group, and the total number of carbon atoms in the three $Z^1$'s is an integer of from 3 to 7), a $C_{6-10}$ cycloalkyl group, a $C_{6-10}$ cycloalkylalkyl group, a $C_{6-10}$ aryl group or a $C_{7-12}$ aralkyl group. From the viewpoint of the weather resistance of the present coating film, Z is preferably a $C_{4-8}$ alkyl group represented by the formula $—C(Z^1)_3$ or a $C_{6-10}$ cycloalkyl group.

The group represented by the formula $—C(Z^1)_3$ has a tertiary carbon atom having three groups represented by the formula $Z^1$ bonded to "C (carbon atom)" represented by the formula, and is directly bonded to the group represented by the formula X. The three $Z^1$'s are preferably such that all of the three groups are methyl groups, or one is a methyl group and the other two are each independently a $C_{2-5}$ alkyl group. The total number of carbon atoms in the other two groups is preferably 6.

The $C_{6-10}$ cycloalkyl group is preferably a cyclohexyl group.

The $C_{6-10}$ cycloalkylalkyl group is preferably a cyclohexylmethyl group.

The $C_{7-12}$ aralkyl group is preferably a benzyl group.

The $C_{6-10}$ aryl group is preferably a phenyl group or a naphthyl group, more preferably a phenyl group.

The hydrogen atom in each of the cycloalkyl group, the cycloalkylalkyl group, the aryl group and the aralkyl group may be substituted by an alkyl group. In such a case, the number of carbon atoms in the alkyl group as a substituent is not included in the number of carbon atoms of the cycloalkyl group or the aryl group.

Further, the monomer A may be used in combination of two or more.

The monomer A may, for example, be specifically vinyl pivalate, vinyl neononanoate (manufactured by HEXION, tradename "VeoVa 9"), vinyl benzoate, vinyl tert-butylbenzoate, tert-butyl vinyl ether, tert-butyl (meth)acrylate and benzyl (meth)acrylate. From the viewpoint of alternating copolymerizability with other monomer (particularly monomer B) and the rate of polymerization, the monomer A is preferably vinyl pivalate or vinyl neononanoate.

The content of the units A in the present invention is, with a view to setting Tg of the fluorinated polymer to a range suitable for the powder coating material, preferably from 5 to 60 mol %, more preferably from 10 to 55 mol %, particularly preferably from 30 to 50 mol %, to all units in the fluorinated polymer.

The monomer B in the present invention is a monomer represented by the following formula (2) and is a monomer which forms units mainly contributing to the impact resistance and the adhesion to substrate of the fluorinated polymer.

$$CHR^{21}=CR^{22}(CH_2)_n COOH \qquad \text{Formula (2):}$$

The symbols in the formula have the following meanings.

$R^{21}$ is a hydrogen atom or a $C_{1-3}$ alkyl group, and is preferably a hydrogen atom or a methyl group.

$R^{22}$ is a hydrogen atom or a $C_{1-3}$ alkyl group, preferably a hydrogen atom.

n is an integer of from 0 to 12, preferably 0 or an integer of from 6 to 12.

The monomer B is, with a view to suitably adjusting the melt viscosity of the fluorinated polymer and the content of the units B in the fluorinated polymer, preferably a monomer (hereinafter sometimes referred to as "monomer B1") represented by the following formula (21) wherein monomer $R^{21}$ and $R^{22}$ are a hydrogen atom and n is from 6 to 12, or a monomer (hereinafter sometimes referred to as "monomer B2") represented by the following formula (22) wherein $R^{21}$ is a $C_{1-3}$ alkyl group, $R^{22}$ is a hydrogen atom, and n is 0.

$$CH_2=CH(CH_2)_{n1} COOH \qquad \text{Formula (21):}$$

$$CHR^{211}=CHCOOH \qquad \text{Formula (22):}$$

The symbols in the formulae have the following meanings.

$R^{211}$ is a $C_{1-3}$ alkyl group, preferably a methyl group.

n1 is an integer of from 6 to 12, preferably an integer of from 8 to 12.

Since the monomer B1 has a structure having a carboxy group bonded to a polymerizable group ($CH_2=CH-$) via a polymethylene group, in the fluorinated polymer having units based on the monomer B1, a hydrogen bond between carboxy groups in its molecule is less likely to form, and the melt viscosity of the fluorinated polymer is easily controlled.

The monomer B2, which has a structure having a carboxy group directly bonded to a polymerizable group (a group represented by the formula $CHR^{211}=CH-$), is likely to increase Tg of the fluorinated polymer. Further, the monomer B2 has a low molecular weight, and accordingly carboxy groups are introduced to the fluorinated polymer effectively relative to the mass of the monomer B2 used.

The monomer B may, for example, be specifically 3-butenoic acid, 4-pentenoic acid, 2-hexenoic acid, 3-hexenoic acid, 5-hexenoic acid, 3-heptenoic acid, 6-heptenoic acid, 7-octenoic acid, 8-nonenoic acid, 9-decenoic acid, 10-undecylenic acid, (meth)acrylic acid or crotonic acid. The monomer B is preferably 10-undecylenic acid or crotonic acid.

Further, the monomer B may be used in combination of two or more. With a view to controlling the melt viscosity and Tg of the fluorinated polymer, as the monomer B, it is preferred to use only the monomer B1 or to use the monomer B1 and the monomer B2 in combination, and in a case where the monomers B1 and B2 are used in combination, it is preferred to use the monomer B2 in an amount of from 0.5 to 3.0 molar times, more preferably from 1.0 to 2.0 molar times, the monomer B1.

Further, the monomer B is a monomer having a polymerizable group represented by the formula $CHR^{21}=CR^{22}-$ and one carboxy group. The monomer B has relaxed steric hindrance as compared with an α,β-unsaturated dicarboxylic acid such as maleic acid or fumaric acid or a monoester of an α,β-unsaturated dicarboxylic acid, and not only has high alternating copolymerizability with the fluoroolefin and the monomer A, but has high steric regularity at the time of polymerization. Accordingly, it is considered that when the units B are contained in a predetermined amount of more in the fluorinated polymer, the carboxy groups are uniformly present, and thus the present coating film is excellent in the impact resistance, the flexibility and the adhesion to substrate.

The content of the units B in the present invention is, to all units in the fluorinated polymer, from 5 to 20 mol %, preferably from 5 to 15 mol %, more preferably from 7 to 15 mol %, particularly preferably from 8 to 12 mol %. In a case where the content of the units B is less than 5 mol %, the flexibility, the impact resistance and the adhesion to substrate of the obtainable coating film will decrease. Further, if the content of the units B is higher than 20 mol %, the blocking resistance of the powder coating material and the flexibility of the obtainable coating film will decrease.

The fluorinated polymer of the present invention may contain, with a view to setting Tg of the fluorinated polymer to be within a range suitable for the powder coating material, units (hereinafter sometimes referred to as "units C") based on a monomer (hereinafter sometimes referred to as "monomer C") represented by the following formula (3). In this case, the content of the units C to all units in the fluorinated polymer is preferably higher than 0 mol % and at most 40 mol %, and with a view to adjusting the melt viscosity of the fluorinated polymer, more preferably higher than 0 mol % and at most 35 mol %, particularly preferably higher than 0 mol % and at most 30 mol %.

$$X^3-Z^3 \qquad \text{Formula (3):}$$

The symbols in the formula have the following meanings.

$X^3$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$. From the viewpoint of the weather resistance of the present coating film, $X^3$ is preferably $CH_2=CHOC(O)-$, $CH_2=CHCH_2OC(O)-$, $CH_2=CHO-$ or $CH_2=CHCH_2O-$, more preferably $CH_2=CHOC(O)-$. A monomer C wherein $X^3$ is $CH_2=CHO-$ or $CH_2=CHCH_2O-$, particularly a monomer C wherein $X^3$ is $CH_2=CHOC(O)-$, is excellent in the alternating copolymerizability with other monomer (particularly monomer B) and the rate of polymerization, and has a high effect to make the units B be uniformly present in the fluorinated polymer. As a result, a powder coating material capable of forming a coating film more excellent in the impact resistance and the flexibility will easily be prepared.

$Z^3$ is a $C_{1-3}$ alkyl group, preferably a methyl group or an ethyl group.

The monomer C may be used in combination of two or more.

The monomer C may, for example, be specifically ethyl vinyl ether, vinyl acetate or vinyl propionate. From the viewpoint of the alternating copolymerizability with other monomer (particularly monomer B) and the rate of polymerization, it is preferably vinyl acetate.

The fluorinated polymer in the present invention, with a view to preparing the powder coating material excellent in the blocking resistance and preventing gelation by interaction with the units B when the fluorinated polymer is formed into a powder, preferably contains no units (hereinafter sometimes referred to as "units D") based on a monomer D (hereinafter sometimes referred to as "monomer D") represented by the following formula (4), or if contains, preferably has a content of the units D of less than 5 mol %, more preferably less than 3 mol %, to all units in the fluorinated polymer.

 Formula (4):

The symbols in the formula have the following meanings.

$X^4$ is $CH_2$=$CHC(O)O$—, $CH_2$=$C(CH_3)C(O)O$—, $CH_2$=$CHOC(O)$—, $CH_2$=$CHCH_2OC(O)$—, $CH_2$=$CHO$— or $CH_2$=$CHCH_2O$—.

$Q^4$ is a 02-20 alkylene group. The alkylene group represented by $Q^4$ may have a cyclic structure.

The monomer D may, for example, be specifically a hydroxyalkyl vinyl ether (such as 2-hydroxyethyl vinyl ether or 4-hydroxybutyl vinyl ether), a hydroxyalkyl allyl ether (such as hydroxyethyl allyl ether) or a hydroxyalkyl (meth) acrylate (such as hydroxyethyl (meth)acrylate).

The fluorinated polymer in the present invention, with a view to maintaining Tg of the fluorinated polymer and maintaining the blocking resistance of the powder coating material of the present invention, preferably contains no units (hereinafter sometimes referred to as "unit E") based on a monomer (hereinafter sometimes referred to as "monomer E") represented by the following formula (5), or if contains, preferably has a content of the units E of less than 8 mol % to all units in the fluorinated polymer.

 Formula (5):

The symbols in the formula have the following meanings.

$X^5$ is $CH_2$=$CHC(O)O$—, $CH_2$=$C(CH_3)C(O)O$—, $CH_2$=$CHOC(O)$—, $CH_2$=$CHCH_2OC(O)$—, $CH_2$=$CHO$— or $CH_2$=$CHCH_2O$—.

$Z^5$ is an alkyl group having at least 4 carbon atoms, excluding a $C_{4-8}$ alkyl group represented by the formula —$C(Z^1)_3$. The three $Z^1$'s are each independently a $C_{1-5}$ alkyl group, and the total number of carbon atoms of the three $Z^1$'s is an integer of from 3 to 7.

The monomer E may, for example, be specifically nonyl vinyl ether, 2-ethylhexyl vinyl ether, hexyl vinyl ether, n-butyl vinyl ether or vinyl neodecanoate (manufactured by HEXION, tradename "VeoVa 10", etc.).

The fluorinated polymer in the present invention has, to all units in the fluorinated polymer, a content of the units F, a content of the units A and a content of the units B of preferably from 20 to 60 mol %, from 5 to 60 mol % and from 5 to 20 mol % in this order, more preferably from 30 to 50 mol %, from 10 to 55 mol % and from 5 to 15 mol %.

The acid value of the fluorinated polymer in the present invention is preferably from 20 to 100 mgKOH/g, more preferably from 30 to 60 mgKOH/g. When the acid value is at least 20 mgKOH/g, the crosslink density of the fluorinated polymer will more increase, and accordingly the present coating film will be more excellent in the flexibility, the impact resistance and the adhesion to substrate. When the acid value is at most 100 mgKOH/g, the thermal stability of the fluorinated polymer, the blocking resistance of the powder coating material and the flexibility of the present coating film will more improve.

Tg of the fluorinated polymer in the present invention is, from the viewpoint of improvement of the blocking resistance of the powder coating material, preferably from 35 to 150° C., more preferably from 45 to 120° C., further preferably from 50 to 100° C., particularly preferably from 50 to 80° C.

The melt viscosity of the fluorinated polymer in the present invention at 170° C. (hereinafter sometimes referred to as "melt viscosity") is from 20 to 100 Pa·s, preferably from 20 to 95 Pa·s, more preferably from 20 to 50 Pa·s. When the melt viscosity is at least 20 Pas, the obtainable coating film will be excellent in the impact resistance and the solvent resistance. When the melt viscosity is at most 100 Pa·s, the coating film obtainable under low temperature film-forming conditions will be excellent in the surface smoothness and the flexibility.

The melt viscosity is preferably set to be within the above range by controlling Mw of the fluorinated polymer and the types and the contents of the units in the fluorinated polymer. The melt viscosity may be adjusted particularly by controlling the types and the contents of the units in the fluorinated polymer, and the types and the contents of the units in the fluorinated polymer may also influence Tg of the fluorinated polymer. Accordingly, by adjusting the types and the contents of the units in the fluorinated polymer as in the present invention, a fluorinated polymer having both melt viscosity and Tg within preferred ranges can be obtained.

Mw of the fluorinated polymer in the present invention is preferably from 15,000 to 75,000, more preferably from 20,000 to 70,000, particularly preferably from 25,000 to 60,000. When Mw of the fluorinated polymer is at least 15,000, the present coating film will be more excellent in the impact resistance and the solvent resistance. When Mw of the fluorinated polymer is at most 75,000, the present coating film formed under low temperature film-forming conditions is sufficient in the impact resistance, the surface smoothness and the flexibility.

Mw of the fluorinated polymer can be set to be within the above range by employing solution polymerization method as a method for producing the fluorinated polymer or by selecting a proper polymerization solvent.

As a method for producing the fluorinated polymer of the present invention, a method of copolymerizing monomers (the fluoroolefin, the monomer A and the monomer B) in the presence of a solvent and a radical polymerization initiator. Further, the monomer C, the monomer D, and the monomer E may further be copolymerized, however, from the above-described reasons, it is preferred not to copolymerize the monomer D and the monomer E.

As a suitable polymerization method in the method for producing the fluorinated polymer, solution polymerization method may be mentioned. By the solution polymerization method, Mw and the content of the units B of the fluorinated polymer are easily controlled to be predetermined ranges, as compared with suspension polymerization method and emulsion polymerization method.

The solvent is preferably an alcohol (such as ethanol, butyl alcohol, propanol or butanol). The alcohol is excellent in the solubility of the monomer B as compared with a nonpolar solvent such as xylene. Accordingly, by using an alcohol as a polymerization solvent, the units B in an appropriate amount are easily introduced to the fluorinated polymer.

The radical polymerization initiator may, for example, be specifically a peroxydicarbonate, a peroxyester, a ketone peroxide, a peroxyketal, a peroxycarbonate ester, a diacyl peroxide or a dialkyl peroxide.

In polymerization, the reaction temperature is usually from 0 to 130° C., the reaction pressure is usually from 0 to 1.0 MPa, and the reaction time is usually from 1 to 50 hours.

The powder coating material of the present invention may be a powder coating material consisting solely of the fluorinated polymer, but preferably contains at least one component other than the fluorinated polymer (hereinafter sometimes referred to as "other component") such as a curing agent, a curing catalyst or a pigment. In the powder coating material of the present invention containing other component, particles constituting the powder coating material (that is, coating material particles) are preferably particles containing the fluorinated polymer and other component. Further, other component (for example, the after-described other resin or particulate pigment) may be contained in the powder coating material of the present invention as second coating material particles. The second coating material particles may also be particles containing a plurality of other components.

The coating material particles in the powder coating material of the present invention are preferably particles containing the fluorinated polymer and other component (particularly a curing agent).

The average particle size of the coating material particles constituting the powder coating material of the present invention is preferably from 1 to 100 μm, more preferably from 25 to 50 μm.

When the average particle size is at least 1 μm, the powder coating material tends to have low cohesiveness and will be uniformly applied at the time of powder coating. Further, when the average particle size is at most 100 μm, the coating film will be more excellent in the surface smoothness and will have a favorable outer appearance.

The powder coating material of the present invention preferably further contains a curing agent comprising a compound having in one molecule at least two epoxy groups, carbodiimide groups, oxazoline groups or β-hydroxyalkylamide groups. Since the fluorinated polymer in the present invention has carboxy groups based on the units B, when the powder coating material of the present invention contains a curing agent reactive with the carboxy group, physical properties of the present coating film, such as weather resistance, acid resistance and shielding properties, will more improve.

In a case where the powder coating material of the present invention contains the curing agent, the content of the curing agent is preferably from 1 to 50 mass %, more preferably from 1 to 20 mass % to the fluorinated polymer in the powder coating material.

The compound having in one molecule at least two epoxy groups may be a bisphenol type epoxy compound (such as A type, F type or S type), a diphenyl ether type epoxy compound, a hydroquinone type epoxy compound, a naphthalene type epoxy compound, a biphenyl type epoxy compound, a fluorene type epoxy compound, a hydrogenated bisphenol A type epoxy compound, a bisphenol A-containing nuclear polyol type epoxy compound, a polypropylene glycol type epoxy compound, a glycidyl ester type epoxy compound, a glycidylamine type epoxy compound, a glyoxal type epoxy compound, an alicyclic epoxy compound, an alicyclic multifunctional epoxy compound, or a heterocyclic epoxy compound (such as triglycidyl isocyanurate (hereinafter sometimes referred to as "TGIC")). It may, for example, be specifically "TM239" (manufactured by Nissan Chemical Industries, Ltd.) having a methylene group introduced to the glycidyl group moiety of TGIC, "TEPIC-SP" (manufactured by Nissan Chemical Industries, Ltd.) which is an epoxy compound having a triazine skeleton, or "PT-910" (manufactured by Hunstman Corporation) which is a mixture of glycidyl trimellitate and glycidyl terephthalate.

The compound having in one molecule at least two carbodiimide groups may be an alicyclic carbodiimide, an aliphatic carbodiimide, an aromatic carbodiimide or a multimer or modified product thereof. It may, for example, be specifically a dicarbodiimide (such as N,N'-diisopropylcarbodiimide, N,N'-dicyclohexylcarbodiimide or N,N'di-2,6-diisopropylphenyl carbodiimide), a polycarbodiimide (such as poly(1,6-hexamethylenecarbodiimide), poly(4,4'-methylenebiscyclohexylcarbodiimide), poly(1,3-cyclohexylene carbodiimide), poly(1,4-cyclohexylene carbodiimide), poly(4,4'-dicyclohexylmethanecarbodiimide), poly(4,4'-diphenylmethanecarbodiimide), poly(3,3'-dimethyl-4,4'-diphenylmethanecarbodiimide), poly(naphthalenecarbodiimide), poly(p-phenylenecarbodiimide), poly(m-phenylenecarbodiimide), poly(tolylcarbodiimide), poly(diisopropylcarbodiimide), poly(methyl-diisopropylphenylenecarbodiimide), poly(1,3,5-triisopropylbenzene)polycarbodiimide, poly(1,3,5-triisopropylbenzene)polycarbodiimide, poly(1,5-diisopropylbenzene)polycarbodiimide, poly(triethylphenylenecarbodiimide) or poly(triisopropylphenylenecarbodiimide)).

The compound having in one molecule at least two oxazoline groups may be an addition-polymerizable oxazoline having a 2-oxazoline group or a polymer of the addition-polymerizable oxazoline. It may, for example, be specifically 2,2'-bis(2-oxazoline), 2,2'-methylene-bis(2-oxazoline), 2,2'-ethylene-bis(2-oxazoline), 2,2'-trimethylene-bis(2-oxazoline), 2,2'-tetramethylene-bis(2-oxazoline), 2,2'-hexamethylene-bis(2-oxazoline), 2,2'-octamethylene-bis(2-oxazoline), 2,2'-ethylene-bis(4,4'-dimethyl-2-oxazoline), 2,2'-p-phenylene-bis(2-oxazoline), 2,2'-m-phenylene-bis(2-oxazoline), 2,2'-m-phenylene-bis(4,4'-dimethyl-2-oxazoline), bis(2-oxazolinylcyclohexane) sulfide, bis(2-oxazolinylnorbornane) sulfide or an oxazoline ring-containing polymer. As specific examples of commercial products, Epocros WS-500, WS-700, K-2010, K-2020 and K-2030 (tradenames) manufactured by NIPPON-SHOKUBAI CO., LTD. may be mentioned.

The compound having in one molecule at least two 3-hydroxyalkylamide groups may, for example, be specifically N,N,N',N'-tetrakis-(2-hydroxyethyl)-adipamide (Prim id XL-552, manufactured by EMS) or N,N,N',N'-tetrakis-(2-hydroxypropyl)-adipamide (Primid QM 1260, manufactured by EMS).

The powder coating material of the present invention may contain a curing catalyst.

The curing catalyst is a compound which promotes the curing reaction when a curing agent is used, and is selected from known curing catalysts depending upon the type of the curing agent. In a case where the powder coating material of the present invention contains a curing catalyst, the content of the curing catalyst is preferably from 0.00001 to 10 mass % to the total mass of the curing agent contained in the powder coating material.

The powder coating material of the present invention may contain a fluorinated polymer other than the fluorinated polymer in the present invention, or may contain a resin containing no fluorine atom (hereinafter sometimes referred to as "other resin"). In a case where the powder coating material of the present invention contains other resin, in order that the present coating film having a layer composed mainly of other resin and a layer composed mainly of the fluorinated polymer laminated in this order on a substrate is easily obtained, the absolute value of the difference between the SP value of the fluorinated polymer and the SP value of other resin is preferably from 0.4 to 16 $(J/cm^3)^{1/2}$.

In a case where the powder coating material of the present invention contains other resin, the mass ratio of the fluorinated polymer to other resin in the powder coating material of the present invention (the mass of the fluorinated polymer/the mass of other resin) is preferably from 0.3 to 3.5, more preferably from 0.35 to 3.

Other resin may be an alkyd resin, an amino alkyd resin, a polyester resin, an epoxy resin, a urethane resin, an epoxy polyester resin, a vinyl acetate resin, a (meth)acrylic resin, a vinyl chloride resin, a phenol resin, a modified polyester resin, an acrylic silicone resin or a silicone resin. Other resin is preferably a polyester resin, a (meth)acrylic resin or an epoxy resin, and from the viewpoint of the adhesion to substrate of the coating film and from the viewpoint such that the fluorinated polymer is less likely to be included in the layer composed mainly of other resin, particularly preferably a polyester resin or a (meth)acrylic resin.

The polyester resin may, for example, be specifically "CRYLCOAT (registered trademark) 4642-3", "CRYL-COAT (registered trademark) 4890-0" or "CRYLCOAT (registered trademark) 4842-3" manufactured by DAICEL-ALLNEX LTD., "U-pica Coat (registered trademark) GV-250", "U-pica Coat (registered trademark) GV-740" or "U-pica Coat (registered trademark) GV-175" manufactured by Japan U-pica Company Ltd., or "Uralac (registered trademark) 1680" manufactured by DSM.

The (meth)acrylic resin may, for example, be specifically "FINEDIC (registered trademark) A-249", "FINEDIC (registered trademark) A-251", "FINEDIC (registered trademark) A-266" manufactured by DIC Corporation, "ALMA-TEX (registered trademark) PD6200" or "ALMATEX (registered trademark) PD7310" manufactured by Mitsui Chemicals, Inc., or "SANPEX PA-55" manufactured by Sanyo Chemical Industries, Ltd.

The epoxy resin may, for example, be specifically "Epikote (registered trademark) 1001", "Epikote (registered trademark) 1002" or "Epikote (registered trademark) 4004P" manufactured by Mitsubishi Chemical Corporation, "EPICLON (registered trademark) 1050" or "EPICLON (registered trademark) 3050" manufactured by DIC Corporation, "Epotohto (registered trademark) YD-012" or "Epotohto (registered trademark) YD-014" manufactured by Nippon Steel & Sum ikin Chemical Co., Ltd., "DENACOL (registered trademark) EX-711" manufactured by Nagase ChemteX Corporation, or "EHPE3150" manufactured by Daicel Corporation.

The powder coating material of the present invention may contain a pigment such as an anticorrosive pigment, an extender pigment or a coloring pigment.

The anticorrosive pigment may, for example, be specifically zinc cyanamide, zinc oxide, zinc phosphate, calcium magnesium phosphate, zinc molybdate, barium borate or zinc calcium cyanamide.

The extender pigment may, for example, be specifically talc, barium sulfate, mica or calcium carbonate.

The coloring pigment may, for example, be quinacridone, diketopyrrolopyrrole, isoindolinone, indanthrone, perylene, perinone, anthraquinone, dioxazine, benzimidazolone, triphenylmethane quinophthalone, anthrapyrimidine, chrome yellow, phthalocyanine, a halogenated phthalocyanine, an azo pigment (such as azomethine metal complex or condensed azo), titanium oxide, carbon black, iron oxide, copper phthalocyanine or a condensed polycyclic pigment.

Further, as the coloring pigment, a luster pigment may also be mentioned. It may, for example, be specifically metal particles (a metal or an alloy thereof, such as aluminum, zinc, copper, bronze, nickel, titanium or stainless steel), mica particles (mica powder), pearl particles, graphite particles, glass flakes, or scaly iron oxide particles.

In a case where the powder coating material of the present invention contains the pigment, the content of the pigment is, to the total mass of the powder coating material, preferably from 1 to 50 mass %, more preferably from 1 to 40 mass %, and from the viewpoint of the weather resistance of the present coating film, particularly preferably from 30 to 40 mass %.

The powder coating material of the present invention may, if necessary, further contain component other than the above (hereinafter sometimes referred to as "other additive"). Such other additive may, for example, be specifically a curing agent other than the above (a curing agent having an isocyanate group, a curing agent having a blocked isocyanate group, etc.), an ultraviolet absorber (an organic ultraviolet absorber, an inorganic ultraviolet absorber, etc.), a light stabilizer (a hindered amine light stabilizer, etc.), a matting agent (micronized synthetic silica, etc.), a leveling agent, a surface conditioner (to improve the surface smoothness of the coating film), a degassing agent, a plasticizer, a filler, a heat stabilizer, a thickener, a dispersing agent, an antistatic agent, an anticorrosive agent, a silane coupling agent, a soil release agent or a low pollution treatment agent.

The method for producing the powder coating material of the present invention is not particularly limited, and as a method for producing a powder coating material composed of coating material particles containing the fluorinated polymer and other component (the curing agent, the curing catalyst, the pigment, other resin, other additive, etc.), the following method may be mentioned.

First, the fluorinated polymer and other component are mixed to obtain a mixture. The obtained mixture is melt-kneaded at from 80 to 130° C. and extruded by an extruder and cooled to obtain a solidified melt-kneaded product. The obtained solidified melt-kneaded product is pulverized and classified to obtain a powder coating material having a desired average particle size.

The fluorinated polymer used for production of the powder coating material may be produced, for example, in such a manner that from a solution containing a fluorinated polymer and a solvent obtained by the above-described method for producing the fluorinated polymer, the solvent is distilled off, followed by pulverization as the case requires.

The coated article of the present invention comprises a substrate, and a coating film formed from the powder coating material on the substrate.

The material of the substrate may, for example, be specifically an inorganic material, an organic material or an organic/inorganic composite material.

The inorganic material may, for example, be specifically concrete, natural stone, glass, or a metal (such as iron, stainless steel, aluminum, copper, brass or titanium).

The organic material may, for example, be specifically a plastic, a rubber, an adhesive or wood.

The organic/inorganic composite material may, for example, be specifically fiber-reinforced plastic, resin-reinforced concrete or fiber-reinforced concrete.

Further, the substrate may be one subjected to known surface treatment (e.g. chemical treatment). Further, on the surface of the substrate, a resin layer (e.g. a polyester resin or an acrylic resin) may be formed.

Among them, the material of the substrate is preferably a metal, more preferably aluminum. An aluminum substrate is excellent in corrosion resistance, light in weight and suitable for an application to building material, such as an exterior member.

The shape, size, etc. of the substrate are not particularly limited.

The substrate may, for example, be specifically an exterior member for building such as a composite panel, a curtain wall panel, a curtain wall frame or a window frame, an automobile member such as a tire wheel, construction machinery, or a frame of a motorcycle.

The thickness of the coating film is preferably from 20 to 1,000 μm, more preferably from 20 to 500 μm. In an application to e.g. a member of a high-rise building, such as an aluminum curtain wall, the thickness of the coating film is preferably from 20 to 90 μm. In an application where the requirement for weather resistance is high, such as an outdoor unit of an air conditioner installed on the coast, a pole of a traffic signal or a sign, it is preferably from 100 to 200 μm.

The coated article of the present invention is produced preferably by applying the powder coating material of the present invention to a substrate to form a powder coating material layer, and subjecting the powder coating material layer to heat treatment to form a coating film on the substrate. The coated article may also be called a substrate provided with a coating film.

The powder coating material layer is preferably formed by applying the powder coating material of the present invention to a substrate by a coating method such as an electrostatic coating method, an electrostatic spraying method, an electrostatic dipping method, a misting method, a flow immersion method, a blowing method, a spraying method, a thermal spraying method, or a plasma spraying method. The coating method is preferably an electrostatic coating method using a powder coating gun, whereby the resulting present coating film will be more excellent in the surface smoothness and the shielding properties.

The powder coating gun may, for example, be specifically a corona charging type spray gun or a friction charging type spray gun. The corona charging type spray gun is a spray gun for spraying a powder coating material by corona discharge treatment. The friction charging type spray gun is a spray gun for spraying a powder coating material by frictional charge treatment.

When the powder coating material layer is subjected to heat treatment, it is preferred to heat the powder coating material layer on the substrate to form a molten film consisting of a melt of the powder coating material on the substrate. Formation of the molten film may be conducted at the same time as formation of the powder coating material layer on the substrate, or may be separately conducted after formation of the powder coating material layer.

The heat temperature (hereinafter sometimes referred to as "baking temperature") and the heating retention time (hereinafter sometimes referred to as "baking time") for heating and melting the powder coating material and for maintaining the molten state for a predetermined time, are suitably set depending upon the type and composition of the raw material components of the powder coating material, the thickness of the desired coating film, etc., and according to the powder coating material of the present invention, the baking temperature can be lowered.

For example, the carboxy groups of the fluorinated polymer in the powder coating material of the present invention are reacted with the curing agent, whereby the present coating film is cured at lower temperature. The reaction of the carboxy groups and the curing agent is advantageous in that high temperature (at a level of 200° C.) as in the case of using the curing agent having a blocked isocyanate group is not required.

On the other hand, as the baking temperature is lowered, physical properties of the coating film tend to be low in general. However, by using the powder coating material of the present invention, it is possible to form a coating film having favorable physical properties as described hereinafter even by baking at low baking temperature.

The baking temperature is preferably from 120° C. to 200° C., more preferably from 140° C. to 180° C. The baking time is usually from 2 to 60 minutes.

The molten film formed on the substrate is preferably cooled to 20 to 25° C. to form the coating film. The cooling may be either quenching or annealing, but annealing is preferred form the viewpoint of the adhesion to substrate of the present coating film.

According to the present invention, a substrate provided with a coating film and a coated article, comprising a substrate and the present coating film formed by baking at a baking temperature of 170° C. which is lower than conventional technique, are obtained. Specifically, the substrate provided with a coating film and the coated article have the following performance.

The substrate provided with a coating film and the coated article of the present invention are excellent in the adhesion to substrate of the coating film, and have peeling of at most 10%, preferably 0% by the after-described cross-cut test.

The substrate provided with a coating film and the coated article of the present invention are excellent in the flexibility of the coating film, and do not have fracture or cracking even when bent by a mandrel having a diameter of less than 6 mm, preferably less than 4 mm by the after-described cylindrical mandrel method.

The substrate provided with a coating film and the coated article of the present invention are excellent in the impact resistance of the coating film, and do not have fracture or cracking even in a falling test from a height of at least 20 cm, preferably at least 40 cm, in the after-described DuPont impact test.

The substrate provided with a coating film and the coated article of the present invention are excellent in the surface smoothness of the coating film, and have a PCI of at least 2, preferably at least 4, as described hereinafter.

The fluorinated polymer of the present invention is a fluorinated polymer having units based on a fluoroolefin, units based on a monomer represented by the formula (1) and units based on a monomer represented by the formula (2), having a content of the units based on the monomer represented by the formula (2) to all units in the fluorinated polymer of from 5 to 20 mol %, and having a weight average molecular weight of from 15,000 to 75,000.

The fluorinated polymer of the present invention is also a fluorinated polymer having units based on a fluoroolefin, units based on a monomer represented by the formula (1) and units based on a monomer represented by the formula (2), having a content of the units based on a monomer represented by the formula (2) to all units in the fluorinated polymer of from 5 to 20 mol %, and having a melt viscosity at 170° C. of from 20 to 100 Pa·s.

Preferred embodiments of the fluorinated polymer of the present invention are the same as those of the fluorinated polymer contained in the powder coating material of the present invention, and its details are omitted.

The fluorinated polymer of the present invention is suitably used for the above-described powder coating material, and is also useful for applications other than the powder coating material. As specific examples of the applications other than the powder coating material, a solvent-based coating material having the fluorinated polymer dissolved in a solvent and an aqueous coating material having the fluorinated polymer dispersed in water, may be mentioned.

EXAMPLES

Now, the present invention will be described in further detail with reference to Examples. However, it should be understood that the present invention is by no means restricted to such specific Examples. Further, blend amounts of the respective components in Tables given later are based on mass. Ex. 1 to 7 are Examples of the present invention, and Ex. 8 to 9 are Comparative Examples.

[Measurement Method, Evaluation Method]
(Content (Mol %) of Units in Fluorinated Polymer)
The content was obtained by analyzing the fluorinated polymer by NMR analysis method.
(Measurement of Mw)
Mw as calculated as polystyrene was obtained by using a high performance GPC apparatus (manufactured by Tosoh Corporation, column: TSK gel G 400XL).
(Measurement of Acid Value)
In accordance with the method in JIS K0070-3 (1992), a predetermined amount of a sample was dissolved in a tetrahydrofuran solution, and titration with an ethanol solution of potassium hydroxide was carried out using phenolphthalein as an indicator to obtain the acid value.
(Measurement of Tg)
The midpoint glass transition temperature as measured by differential scanning calorimetry (DSC) method was taken as Tg.
(Measurement of Melt Viscosity)
As the melt viscosity, the sample was heated at a heating rate of 10° C./min from 130° C. to 200° C. by using a rotary rheometer (manufactured by Anton Paar GmbH, MCR302), and the value at 170° C. was read.
(Blocking Resistance of Powder Coating Material)
A powder coating material produced in accordance with the after-described Example was put in a closed bottle and stored at room temperature (25° C.), and the time until blocking was observed was measured.
◯: No blocking observed even after a lapse of 15 days or more.
Δ: Blocking observed after a lapse of more than 15 days.
x: Blocking observed within less than one day.
(Adhesion to Substrate of Coating Film)
It was evaluated by cross-cut test (JIS K5600-5-6). The coating film of a test specimen was cut into a grid with 100 cells at 1 mm intervals, an adhesive tape was bonded thereon and then peeled, and the number of cells which were not peeled by the adhesive tape among the 100 cells was measured, on the basis of which the adhesion was evaluated in accordance with the following standard.
◯: The number of cells not peeled is 100.
Δ: The number of cells not peeled is at least 90 and at most 99.
x: The number of cells not peeled is less than 90.
(Flexibility of Coating Film)
It was evaluated by cylindrical mandrel method (JIS K5600-5-1). A test specimen was bent along a mandrel having a specified diameter so that the coating film side faced outside, and whether fatal damages such as fracture or cracking occurred on the coating film surface or not was visually evaluated.
◯: No fracture nor cracking occurs even with a diameter of less than 4 mm.
Δ: No fracture nor cracking occurs with a diameter of at least 4 mm and less than 6 mm.
x: Fracture or cracking occurs even with a diameter of at least 6 mm.
(Impact Resistance of Coating Film)
It was evaluated with DuPont impact test (JIS K5600-5-3). Using a DuPont impact tester, a test specimen was placed so that the coating film surface faced upward, a weight was dropped on the coating film, and whether fracture or cracking occurred on the coating film where the weight was dropped or not was observed.
◯: No fracture nor cracking occurs even when the weight is dropped from a height of 40 cm or higher.
Δ: No fracture nor cracking occurs when the weight is dropped from a height of at least 20 cm and less than 40 cm.
x: Fracture or cracking occurs even when the weight is dropped from a height of less than 20 cm.
(Surface Smoothness of Coating Film (Under Low Temperature Film-Forming Conditions))
The surface smoothness of the coating film of a test specimen was evaluated by standard plates for visual evaluation of smoothness by PCI (The Powder Coating Institute). There are ten standard plates 1 to 10, the larger number indicating more excellent smoothness.
◯: A PCI value of at least 4.
Δ: A PCI value of at least 2 and less than 4.
x: A PCI value of less than 2.

[Component Used for Production of Powder Coating Material]
(Fluorinated Polymer)
A fluorinated polymer produced in accordance with the after-described Example was used. $CF_2=CFCl$ (CTFE) was used as the monomer F, vinyl pivalate (PV), vinyl neononanoate (NV) (manufactured by HEXION, tradename "VeoVa 9") or cyclohexyl vinyl ether (CHVE) was used as the monomer A, 10-undecylenic acid (UDA, corresponding to units B1) or crotonic acid (CA, corresponding to units B2) was used as the monomer B, vinyl acetate (AV) was used as the monomer C, and 4-hydroxybutyl vinyl ether (HBVE) was used as the monomer D.
NV is a vinyl ester represented by the formula $CH_2=CHOC(O)C(CH_3)(Z^{11})_2$, wherein the two $Z^{11}$'s are each independently a $C_{1-5}$ alkyl group, and the total number of carbon atoms in the two $Z^{11}$'s is 6.
(Curing Agent)
Curing agent A: Compound having at least two epoxy groups in one molecule (manufactured by Hunstman Corporation, PT-910 (tradename))
Curing agent B: Compound having at least two epoxy groups in one molecule (manufactured by Nissan Chemical Industries, Ltd., TEPIC-SP (tradename))
Curing agent C: Compound having at least two β-hydroxyalkylamide groups in one molecule (manufactured by EMS, Primid XL-552 (tradename))
(Curing Catalyst)
Curing catalyst: Xylene solution of dibutyltin dilaurate (10,000-fold diluted)
(Pigment)
Pigment: Titanium oxide pigment (manufactured by DuPont, Ti-Pure R960 (tradename), titanium oxide content: 89 mass %)
(Other Component Other than the Above)
Degassing agent: benzoin
Surface conditioner: manufactured by BYK Japan KK, BYK-360P (tradename)

Preparation Example 1

Into an autoclave (having an internal capacity of 2.7 L, made of stainless steel, equipped with a stirrer, the same applies hereinafter), KYOWAAD KW500SH (tradename, manufactured by Kyowa Chemical Industry Co., Ltd., hereinafter sometimes referred to as "adsorbent") (15.1 g) was charged, and the autoclave was evacuated of air.

Then, tert-butyl alcohol (422 g), ethanol (106 g), Tinuvin292 (tradename, manufactured by BASF, hereinafter sometimes referred to as "stabilizer") (15.1 g), CTFE (465 g), PV (440 g) and UDA (103 g) were introduced into the autoclave, and the temperature was raised and maintained at 65° C. The pressure at this point was 0.59 MPa.

Into the autoclave, a 50 mass % xylene solution of tert-butyl peroxypivalate (hereinafter sometimes referred to as "polymerization initiator solution") (2 mL) was added to initiate polymerization. During the polymerization, the polymerization initiator solution (45 mL) was continuously added. The polymerization was continued with stirring, and 11 hours later, the autoclave was cooled with water to terminate the polymerization. Then, the solution in the autoclave was subjected to filtration, and unreacted monomers contained in the obtained filtrate were removed by an evaporator to obtain a solution containing fluorinated polymer.

The obtained solution was vacuum dried at 65° C. for 24 hours to remove the solvent, and further vacuum dried at 130° C. for 20 minutes to obtain fluorinated polymer in a block form, which was pulverized to obtain powdery fluorinated polymer 1.

The fluorinated polymer 1 was a polymer having units based on CTFE, units based on PV and units based on UDA in amounts of 41 mol %, 50 mol % and 9 mol % in this order. Of the fluorinated polymer 1, Tg was 52° C., Mw was 59,300, the acid value was 33 mgKOH/g, and the melt viscosity was 81 Pa·s.

Preparation Example 2

Into an autoclave, the adsorbent (34.0 g) was charged, and the autoclave was evacuated of air.

Then, tert-butyl alcohol (223 g), 2-propanol (223 g), the stabilizer (34.0 g), CTFE (509 g), CHVE (397 g) and UDA (226 g) were introduced into the autoclave. The temperature was gradually raised and maintained at 65° C. The pressure at this point was 0.73 MPa.

Into the autoclave, the polymerization initiator solution (2 mL) was added to initiate polymerization. During the polymerization. The polymerization initiator solution (90 mL) was continuously added. The reaction was continued with stirring, and 11 hours later, the autoclave was cooled with water to terminate the polymerization. Then, the solution in the autoclave was subjected to filtration, and unreacted monomers contained in the obtained filtrate were removed by an evaporator to obtain a solution containing fluorinated polymer.

The obtained solution was washed by liquid separation with methanol twice. In one washing by liquid separation, 500 g of methanol was used based on 30 g of the fluorinated polymer.

The solution was vacuum dried at 65° C. for 24 hours to remove the solvent, and further vacuum dried at 130° C. for 20 minutes to obtain fluorinated polymer in a block form, which was pulverized to obtain powdery fluorinated polymer 2.

The fluorinated polymer 2 was a polymer having units based on CTFE, units based on CHVE and units based on UDA in amounts of 52 mol %, 41 mol % and 7 mol % in this order. Of the fluorinated polymer 2, Tg was 51° C., Mw was 18,500, the acid value was 31 mgKOH/g, and the melt viscosity was 42 Pa·s.

Preparation Examples 3 to 5

Fluorinated polymers 3 to 5 were obtained in the same manner as in Preparation Example 1 except that tert-butyl alcohol (422 g) and ethanol (106 g) were changed to tert-butyl alcohol (370 g) and xylene (158 g), in addition to the types and the amounts of monomers used.

Preparation Example 6 (Comparative Preparation Example)

Fluorinated polymer 6 was obtained in the same manner as in Preparation Example 2 except that tert-butyl alcohol (223 g) and 2-propanol (223 g) were change to xylene (356 g) and ethanol (90 g) in addition to the types and the amounts of monomers used.

Preparation Example 7 (Comparative Preparation Example)

Fluorinated polymer 7 was obtained in the same manner as in Preparation Example 1 except that tert-butyl alcohol (422 g) and ethanol (106 g) were changed to tert-butyl alcohol (528 g), in addition to the types and the amounts of monomers used.

Preparation Example 8 (Comparative Preparation Example)

Fluorinated polymer 8 in a block form was obtained in the same manner as in Preparation Example 2 except that tert-butyl alcohol (223 g) and 2-propanol (223 g) were changed to xylene (356 g) and ethanol (90 g), in addition to the types and the amounts of monomers used. However, the fluorinated polymer 8 gelled when pulverized, and the melt viscosity could not be measured.

Preparation Example 9 (Comparative Preparation Example)

Into an autoclave, potassium carbonate (12.3 g) was charged, and the autoclave was evacuated of air.

Then, xylene (503 g), ethanol (142 g), the adsorbent (4.5 g), CTFE (387 g), CHVE (326 g) and HBVE (84.9 g) were introduced into the autoclave, and the temperature was raised and maintained at 65° C. The pressure at this point was 0.55 MPa.

Into the autoclave, the polymerization initiator solution (1 mL) was added to initiate polymerization. During the polymerization, the polymerization initiator solution (19 mL) was continuously added. The polymerization was continued with stirring, and 11 hours later, the autoclave was cooled with water to terminate the polymerization. Then, the solution in the autoclave was subjected to filtration, and unreacted monomers contained in the obtained filtrate were removed by an evaporator to obtain a solution containing fluorinated polymer.

The obtained solution was vacuum dried at 65° C. for 24 hours to remove the solvent, and further vacuum dried at 130° C. for 20 minutes to obtain fluorinated polymer in a block form, which was pulverized to obtain powdery fluorinated polymer.

Further, in a flask, the fluorinated polymer (220 g) was dissolved in methyl ethyl ketone (300 g) and stirred. Succinic anhydride (14 g) was added to the flask, and the temperature in the flask was raised to 75° C., and triethylamine (1 g) was added, followed by reaction for 5 hours. The temperature in the flask was lowered to 25° C., and the solution in the flask was subjected to IR measurement to confirm disappearance of the peak of the acid anhydride group of succinic anhydride.

The solution in the flask was vacuum dried at 65° C. for 24 hours to remove the solvent, and further vacuum dried at 130° C. for 20 minutes to obtain fluorinated polymer 9 in a block form.

The fluorinated polymer 9 was a polymer having units based on CTFE, units based on CHVE, units based on HBVE, and units formed by addition of succinic anhydride to the hydroxy group of the units based on HBVE (units having —O(CH$_2$)$_4$OC(O)CH$_2$CH$_2$COOH in its side chain, hereinafter sometimes referred to as "other units") in amounts of 50 mol %, 39 mol %, 3 mol % and 8 mol % in this order. Of the fluorinated polymer 9, Tg was 52° C., Mw was 45,500 and the acid value was 30 mgKOH/g. However, the fluorinated polymer 9 gelled when pulverized, and the melt viscosity could not be measured.

Physical properties of the fluorinated polymers obtained in the respective Preparation Examples are shown in Table 1.

TABLE 1

|  |  |  | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 | Prep. Ex. 9 |
|---|---|---|---|---|---|---|---|---|---|---|---|
| Fluorinated polymer |  |  | 1 | 2 | 3 | 4 | 5 | 6 | 7 | 8 | 9 |
| Contents | Units F | CTFE | 41 | 52 | 41 | 42 | 41 | 52 | 40 | 51 | 50 |
| of units in | Units A | CHVE |  | 41 |  |  |  | 44 |  | 33 | 39 |
| fluorinated |  | PV | 50 |  | 46 | 13 |  |  | 27 |  |  |
| polymer |  | NV |  |  |  |  | 49 |  |  |  |  |
| (mol %) | Units B | UDA | 9 | 7 | 13 | 5 | 6 | 4 |  | 7 |  |
|  |  | CA |  |  |  | 6 | 4 |  | 7 |  |  |
|  | Units C | AV |  |  |  | 34 |  |  | 26 |  |  |
|  | Units D | HBVE |  |  |  |  |  |  |  | 9 | 3 |
|  |  | Other units |  |  |  |  |  |  |  |  | 8 |
| Physical | Mw |  | 59300 | 18500 | 23000 | 36600 | 24300 | 19800 | 76200 | 41000 | 45500 |
| properties of | Tg (° C.) |  | 52 | 51 | 36 | 44 | 51 | 44 | 68 | 33 | 52 |
| fluorinated | Acid value (mgKOH/g) |  | 33 | 31 | 56 | 56 | 32 | 16 | 36 | 32 | 30 |
| polymer | Melt viscosity (Pa · s) |  | 81 | 42 | 21 | 39 | 92 | 33 | 2155 | Unmeasurable | Unmeasurable |

[Production of Powder Coating Material]

The powdery fluorinated polymer and components as identified in Table 2 were mixed by a high-speed mixer (manufactured by YU CHI MACHINERY CO., LTD.) for from about 10 to about 30 minutes to obtain a powdery mixture. The obtained mixture was melt-kneaded by a twin-screw extruder (manufactured by Thermo PRISM, 16 mm extruder) at a barrel setting temperature of 120° C. to obtain pellets. The obtained pellets were pulverized by a pulverizer (manufactured by FRITSCH, tradename: Rotor Speed Mill P14) at room temperature (25° C.) and classified by 150 mesh to obtain a powder coating material having an average particle size of about 40 μm.

In a case where the fluorinated polymers 8 and 9 were used, since the fluorinated polymers 8 and 9 gelled, no powder coating material could be produced.

[Preparation of Test Specimen]

The powder coating material was applied by electrostatic coating on one surface of an aluminum plate (substrate) having chromate treatment applied thereto by an electrostatic coating machine (manufactured by Onoda Cement Co., Ltd., GX3600C) and held in an atmosphere at 170° C. for 20 minutes to obtain a molten film of the powder coating material. The molten film was left to stand and cooled to room temperature (25° C.) to obtain an aluminum plate provided with a coating film having a thickness of from 55 to 65 μm. The obtained aluminum plate provided with a coating film as a test specimen was subjected to evaluations. The results are shown in Table 2.

TABLE 2

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Fluorinated polymer | Fluorinated polymer | 1 | 1 | 1 | 2 | 3 | 4 | 5 | 6 | 7 |
|  | Content (g) | 100 | 85 | 85 | 90 | 46 | 90 | 99 | 62 | 90 |
| Curing agent | Curing agent A (g) | 8.6 |  |  | 7.4 |  | 7.7 | 8.5 |  | 7.4 |
|  | Curing agent B (g) |  | 4 |  |  |  |  |  | 1.5 |  |
|  | Curing agent C (g) |  |  | 5.2 |  | 5.2 |  |  |  |  |
| Surface modifier (g) |  | 1.7 | 1.4 | 1.4 | 1.5 | 0.8 | 1.5 | 1.6 | 1.2 | 1.5 |
| Degassing agent (g) |  | 0.7 | 0.5 | 0.6 | 0.6 | 0.3 | 0.6 | 0.7 | 0.5 | 0.6 |
| Pigment (g) |  | 58.4 | 47.9 | 48.6 | 52.5 | 27.6 | 52.5 | 57.8 | 42.0 | 52.5 |
| Curing catalyst (g) |  | 0.4 | 1.7 | 3.1 | 0.3 | 0.2 | 0.3 | 0.4 | 0.3 | 0.3 |
| Evaluation results | Blocking resistance of powder coating material | ○ | ○ | ○ | ○ | Δ | Δ | ○ | Δ | ○ |
|  | Adhesion to substrate of coating film | ○ | ○ | ○ | ○ | ○ | ○ | ○ | x | ○ |

TABLE 2-continued

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Flexibility of coating film | ○ | ○ | ○ | ○ | ○ | ○ | ○ | x | x |
| Impact resistance of coating film | ○ | ○ | ○ | ○ | ○ | ○ | ○ | x | ○ |
| Surface smoothness of coating film (under low temperature film-forming conditions) | ○ | ○ | ○ | ○ | ○ | ○ | Δ | ○ | x |

As shown in Table 2, by using a powder coating material (Ex. 1 to 7) in which the content of the units B to all units in the fluorinated polymer is from 5 to 20 mol % and the melt viscosity of the fluorinated polymer at 170° C. is from 20 to 100 Pa·s, it is possible to form a coating film excellent in the impact resistance, the flexibility and the adhesion to substrate and is excellent in the surface smoothness even formed under low temperature film-forming conditions.

In Ex. 8, it is considered that since the content of the units B in the fluorinated polymer is less than 5 mol %, the coating film is inferior in the adhesion to substrate, the flexibility and the impact resistance. Further, in Ex. 9, it is considered that since the melt viscosity is out of the predetermined range, the fluorinated polymer at the time of heat treatment is inferior in fluidity, and not only the surface smoothness of the coating film is poor, but also no dense coating film can be formed, and the coating film is inferior in the flexibility.

This application is a continuation of PCT Application No. PCT/JP2018/000500, filed on Jan. 11, 2018, which is based upon and claims the benefit of priority from Japanese Patent Application No. 2017-003520 filed on Jan. 12, 2017. The contents of those applications are incorporated herein by reference in their entireties.

What is claimed is:

1. A powder coating material comprising a fluorinated polymer comprising a fluoroolefin unit, a monomer unit of formula (1) and a monomer unit of formula (2),
wherein the content of the monomer unit of formula (2) is from 5 to 20 mol % to all units in the fluorinated polymer, and
the fluorinated polymer has a melt viscosity at 170° C. of from 20 to 100 Pa·s:

$$X-Z \quad \text{formula (1):}$$

$$CHR^{21}=CR^{22}(CH_2)_n COOH \quad \text{formula (2):}$$

wherein X is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$,
Z is a $C_{4-8}$ alkyl group represented by the formula $-C(Z^1)_3$, a $C_{6-10}$ cycloalkyl group, a $C_{6-10}$ cycloalkylalkyl group, a $C_{6-10}$ aryl group or a $C_{7-12}$ aralkyl group, provided that three $Z^1$'s are each independently a $C_{1-5}$ alkyl group, and the total number of carbon atoms of the three $Z^1$'s is an integer of from 3 to 7,
$R^{21}$ and $R^{22}$ are each independently a hydrogen atom or a $C_{1-3}$ alkyl group, and
n is an integer of from 0 to 12.

2. The powder coating material according to claim 1, wherein the fluorinated polymer has a glass transition temperature of from 45 to 120° C.

3. The powder coating material according to claim 1, wherein the fluorinated polymer has a weight average molecular weight of from 15,000 to 75,000.

4. The powder coating material according to claim 1, wherein the content of the fluoroolefin unit is from 20 to 60 mol %, and the content of the monomer unit of formula (1) is from 5 to 60 mol %, to all units in the fluorinated polymer.

5. The powder coating material according to claim 1, wherein the fluorinated polymer further comprises a monomer unit of formula (3) in an amount of more than 0 mol % and at most 40 mol % to all units in the fluorinated polymer:

$$X^3-Z^3 \quad \text{formula (3):}$$

wherein $X^3$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, and
$Z^3$ is a $C_{1-3}$ alkyl group.

6. The powder coating material according to claim 1, wherein the fluorinated polymer contains no monomer units of formula (4), or contains the monomer units of formula (4) in a content of less than 5 mol % to all units in the fluorinated polymer:

$$X^4-Q^4-OH \quad \text{formula (4):}$$

wherein $X^4$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, and
$Q^4$ is a $C_{2-20}$ alkylene group which may contain a cyclic structure.

7. The powder coating material according to claim 1, wherein the fluorinated polymer contains monomer units of formula (5), or contains the monomer units of (5) in a content of less than 8 mol % to all units in the fluorinated polymer:

$$X^5-Z^5 \quad \text{formula (5):}$$

wherein $X^5$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, and
$Z^5$ is an alkyl group having at least 4 carbon atoms, excluding a $C_{4-8}$ alkyl group represented by the formula $-C(Z^1)_3$,
provided that three $Z^1$'s are each independently a $C_{1-5}$ alkyl group, and the total number of carbon atoms of the three $Z^1$'s is an integer of from 3 to 7.

8. The powder coating material according to claim 1, which further comprises a curing agent comprising a compound having in one molecule at least two epoxy groups, carbodiimide groups, oxazoline groups or β-hydroxyalkylamide groups.

9. The powder coating material according to claim 8, wherein the content of the curing agent is from 1 to 50 mass % to the fluorinated polymer.

10. The powder coating material according to claim 8, comprising particles containing the fluorinated polymer and the curing agent.

11. A method for producing a substrate provided with a coating film, which comprises applying the powder coating material as defined in claim 1 to a substrate to form a powder coating material layer, and subjecting the powder coating material layer to heat treatment to form a coating film on the substrate.

12. A coated article comprising a substrate and a coating film formed from the powder coating material as defined in claim 1 on the substrate.

13. A fluorinated polymer, comprising a fluoroolefin unit, a monomer unit of formula (1) and a monomer unit of formula (2),
wherein the content of the monomer unit of formula (2) is from 5 to 20 mol % to all units in the fluorinated polymer, and
the fluorinated polymer has a weight average molecular weight of from 15,000 to 75,000:

$$X-Z \qquad \text{formula (1):}$$

$$CHR^{21}=CR^{22}(CH_2)_n COOH \qquad \text{formula (2):}$$

wherein X is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, Z is a $C_{4-8}$ alkyl group represented by the formula $-C(Z^1)_3$, a $C_{6-10}$ cycloalkyl group, a $C_{6-10}$ cycloalkylalkyl group, a $C_{6-10}$ aryl group or a $C_{7-12}$ aralkyl group, provided that three $Z^1$'s are each independently a $C_{1-5}$ alkyl group, and the total number of carbon atoms of the three $Z^1$'s is an integer of from 3 to 7, $R^{21}$ and $R^{22}$ are each independently a hydrogen atom or a $C_{1-3}$ alkyl group, and n is an integer of from 0 to 12.

14. A fluorinated polymer, comprising a fluoroolefin unit, a monomer unit of formula (1) and a monomer unit of represented by the following formula (2),
wherein the content of the monomer unit of formula (2) is from 5 to 20 mol % to all units in the fluorinated polymer, and
the fluorinated polymer has a melt viscosity at 170° C. of from 20 to 100 Pa·s:

$$X-Z \qquad \text{formula (1):}$$

$$CHR^{21}=CR^{22}(CH_2)_n COOH \qquad \text{formula (2):}$$

wherein X is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, Z is a $C_{4-8}$ alkyl group represented by the formula $-C(Z^1)_3$, a $C_{6-10}$ cycloalkyl group, a $C_{6-10}$ cycloalkylalkyl group, a $C_{6-10}$ aryl group or a $C_{7-12}$ aralkyl group, provided that three $Z^1$'s are each independently a $C_{1-5}$ alkyl group, and the total number of carbon atoms of the three $Z^1$'s is an integer of from 3 to 7, $R^{21}$ and $R^{22}$ are each independently a hydrogen atom or a $C_{1-3}$ alkyl group, and n is an integer of from 0 to 12.

* * * * *